(12) United States Patent
Jordan

(10) Patent No.: US 6,715,449 B1
(45) Date of Patent: Apr. 6, 2004

(54) ADJUSTABLE ANIMAL COLLAR

(75) Inventor: Mark J. Jordan, Dublin, OH (US)

(73) Assignee: Jordan Brands, Inc., Newcastle, WA (US)

( * ) Notice: Subject to any disclaimer, the term of this patent is extended or adjusted under 35 U.S.C. 154(b) by 0 days.

(21) Appl. No.: 10/349,288

(22) Filed: Jan. 21, 2003

(51) Int. Cl.$^7$ .................. A01K 27/00; A44B 11/28; A44B 11/20
(52) U.S. Cl. ............... 119/863; 24/170; 24/DIG. 48
(58) Field of Search ............... 119/863, 856; 24/DIG. 48, DIG. 47, 593.11, 170, 647, 650, 191

(56) References Cited

U.S. PATENT DOCUMENTS

| | | | |
|---|---|---|---|
| 405,551 A | * 6/1889 | Gunn | 119/863 |
| 4,044,725 A | 8/1977 | Miller | |
| 4,174,553 A | * 11/1979 | Schrougham et al. | 24/321 |
| 4,669,155 A | * 6/1987 | Chen | 24/170 |
| 4,733,440 A | * 3/1988 | Ogawa | 24/170 |
| 5,297,514 A | 3/1994 | Stout et al. | |
| 5,316,266 A | 5/1994 | Chou | |
| 5,398,383 A | 3/1995 | Bingold | |
| 5,579,563 A | * 12/1996 | Sim | 24/587.12 |
| 5,673,463 A | * 10/1997 | Chih-wen | 24/265 BC |
| 5,687,455 A | * 11/1997 | Alexander | 24/16 PB |
| 5,701,849 A | * 12/1997 | Suchowski et al. | 119/865 |
| 5,745,959 A | 5/1998 | Dodge | |
| 5,749,127 A | * 5/1998 | Hsieh | 24/3.13 |
| 5,774,953 A | * 7/1998 | Mao | 24/579.09 |
| 6,067,662 A | * 5/2000 | Sim | 2/339 |
| 6,067,692 A | * 5/2000 | Chang | 24/303 |
| 6,205,956 B1 | * 3/2001 | Dickie et al. | 119/792 |
| 6,283,065 B1 | * 9/2001 | Shorrock et al. | 119/863 |
| 2002/0189056 A1 | * 12/2002 | Gallina et al. | 24/68 R |

OTHER PUBLICATIONS miscellaneous literature from the www.brani.com website, ORANGTIGA Company NV, Beeldhouwersstraat 12 B–2000, Antwerpen, Belgium.

* cited by examiner

Primary Examiner—Son T Nguyen
(74) Attorney, Agent, or Firm—Gallagher and Dawsey Co.; David J. Dawsey; Michael J. Gallagher (57) ABSTRACT

An adjustable animal collar provides a strap with a housing at one end and a second end connected to an engagement area. The engagement area is formed with a plurality of teeth received into the housing, where a rotating pawl engages the teeth. The pawl, pivotably rotating within the housing and partly covered in one embodiment with a cover plate, has a biasing means, which in one embodiment is a torsion spring, to bias the pawl in favor of engagement with at least one of the teeth. The biasing means can be overcome by manual pressure on a portion of the pawl, causing release of the collar. The collar may have at least one safety device preventing the pawl from being inadvertently disengaged, and a safety indicia area to visually indicate the locked or unlocked status of the collar. The collar is capable of attachment to a variety of accessories.

21 Claims, 8 Drawing Sheets

ADJUSTABLE ANIMAL COLLAR

TECHNICAL FIELD

The present invention relates to the field of animal care products, particularly to an adjustable collar.

BACKGROUND OF THE INVENTION

People have kept small animals, such as dogs and cats, as pets for untold millennia. For both the safety of the pet and the safety of others, an important factor in responsible animal ownership is providing for the safe and efficient restraint of the animal, while maximizing the comfort of the animal. In addition to pets, non-pet animals, such as might be found in zoos, occasionally require restraint.

The most common means of animal restraint, at least for many small animals such as cats and dogs, has been through the use of collars placed around the animal's neck. A well-designed animal collar must conform to such requirements as closeness of fit, strength, durability and good looks, and availability of options such as points of attachment for identification and license tags, or leashes. A type of collar sometimes used is a harness, which encompasses in varying degrees, some part of the shoulders and neck. The art has long needed improvements in animal collars that address closeness of fit. Closeness of fit is primarily important for two reasons. First, many small animals, such as cats and dogs, have heads that are not much larger in diameter than the diameter of their necks. Accordingly, if a collar fits too loosely, the animal may "back-out" of the collar; that is, by applying retrograde pressure against the restraint of the collar, the animal can pull a loosely fitting collar backwards over its ears and escape. Additionally, a too loose collar invites entanglement with such objects as fences and tree limbs, often with disastrous strangulation to the animal and heartbreak to the owner. However, a too tight collar or harness should also be avoided. A collar that is too tight is both uncomfortable for the animal and liable to interfere with breathing, especially as the animal exercises, and can possibly lead to chafing, sores, or infection.

The issue of closeness of fit is also a variable requiring periodic adjustment. If an animal is acquired as a juvenile, such as a puppy or kitten, it will require a number of size adjustments to its collar as it grows. An adjustable animal collar that is adjustable over a wide plurality of lengths obviates the need to buy replacement collars as the animal grows. Even as an adult, an animal may gain or lose weight, and require adjustment to the size of its collar. However, adjustment must be dependable, that is, it must be easy to adjust when needed, but not change adjustment in response to the activities of the animal.

The traditional means for providing adjustment is that of providing a plurality of holes near one end of a circumferential collar, designed to be engaged by a locking pin of some sort. The obvious shortcoming of this system is that there is no adjustability between holes in the collar, and animal owners must sometimes choose between holes that may be too tight or too loose, or else drill an additional hole between two pre-existing holes. Such a drilling task can be arduous, depending on the collar material, and can mar the appearance of the collar. Each new adjustment location requires a new hole to be drilled, possibly filling the collar with a plurality of unsightly and weakening holes.

Attempts have been made in the prior art to provide adjustment with a traditional, hole and pin, collar, as exemplified by U.S. Pat. No. 5,297,514 to Stout, et al. The '514 device employs a multiple buckle system to lock adjustments that while perhaps effective, adds numerous parts and layers of collar material to a device where simplicity is desired.

Strength of the collar is rarely an issue, when not weakened by additional adjustment holes, as it is quite feasible to manufacture a collar of modern materials that most animals cannot break. In fact, as discussed in the context of a too loose collar above, a problem with animal collars is inherent in their very strength. Since the collar is likely to be stronger than the animal, the animal faces a real danger of strangulation should the collar become ensnared on an object such as a fence or tree limb. Making a "break-away" collar, as seen in U.S. Pat. No. 4,044,725 to Miller, is a dubious proposition, as an animal can strangle due to a continuing applied pressure, such as when caught on a fence, that is much lower than the momentary pressure exerted when an animal lunges against its restraint. As such, a break-away collar is apt to either release prematurely when an animal lunges against its restraint, or else fail to release in a true choking situation. Accordingly, most animal owners eschew the break-away concept and rely instead on a closely fitting collar, with all the attendant problems noted above, to safely restrain their animals.

Animal owners desire a collar that is durable and good looking. A traditional material is leather, but this has numerous drawbacks. Leather is difficult to keep clean, and is susceptible to water damage. This is particularly apparent with animals that live outdoors, or who enjoy playing in water, as a leather, or even fabric or otherwise "weather resistant" collar can rapidly become moldy and offensive with repeated wetting.

For all the aforementioned reasons, an entirely new direction in adjustable animal collars has been needed. Ratchet and pawl technology has been available as a means of securing bindings of various types for some time. In a very common embodiment, this mechanism works by providing a winding mechanism that winds a predetermined amount of strap onto the winding mechanism. At least one ratchet attached to the winding mechanism is releasably engaged by at least one pawl, generally engaged with the teeth of the ratchet mechanism by a spring-loaded device. The shape of the cooperating teeth of the ratchet and the pawl allow one way tightening of the strap. The ratchet is released by moving the pawl away from and out of engagement with the teeth. Such a mechanism is typified by U.S. Pat. No. 5,316,266 to Chou. As is typical of this type of embodiment, a rotatable handle in the '266 device allows leverage to be applied to the ratchet and pawl mechanism to increase the mechanical advantage during tightening and thereby to tighten the strap very tightly. Obviously, provision of such a mechanical advantage in an animal collar would be highly dangerous, as it could easily be over tightened.

In a different embodiment, ratchet and pawl technology is seen in the strap tightening device of U.S. Pat. No. 5,398,383 to Bingold. In the '383 device, the ratchet is a series of linearly arranged teeth molded into the strap on a pair of two-loop, disposable, plastic law enforcement restraints (handcuffs). The teeth of the ratchet have, in relation to the strap, one angulated side and one right angle side. To tighten the strap, the strap needs only be pulled such that the angulated sides of the ratchet teeth encounter the pawl first. This tends to displace the pawl away from the strap, allowing the strap to pass. As the ratchet teeth pass the pawl, the pawl, under spring load, returns toward the strap behind the passing tooth, and prevents backsliding of the strap. Unless the spring load is released, the strap can only be tightened.

In fact, the '383 device has no provision for loosening, and must be cut off to release the device. Besides the impracticality, in the context of animal collars, the adaptation of this technology would also be highly dangerous for another reason. Since the strap can only be tightened, and tightens automatically as the strap is advanced, any struggling or manipulation of the collar by the animal can only tighten the collar. This is dangerous in an animal control context, where a positive safety device should be employed to prevent the animal from either tightening or loosening the collar on its own. As an animal may become increasingly panicked when a collar tightens, such a ratchet and pawl device without a positive safety device is likely to tighten further as the animal struggles, thus further panicking and endangering the animal.

A combination of the linear ratchet of the '383 type and the mechanically advantaged ratchet and pawl of the '266 type is seen in snowboard bindings, as typified by U.S. Pat. No. 5,745,959 to Dodge. While the snowboard binding of the '959 device provides a means of releasing the spring load on the pawl to release the strap, this design in unsuitable for the animal collar application of the instant invention for at least two of the reasons elucidated above. First, the mechanical advantage could allow dangerous force to be applied to an animal's neck, and second, the absence of a positive lock would prevent the animal owner from locking the tightening mechanism so that the animal could not inadvertently tighten or loosen the collar around its own neck.

Accordingly, the art has needed a means for improving the art of animal collars. While some of the prior art devices attempted to improve the state of the art of animal collars, none has achieved the unique and novel configurations and capabilities of the present invention. With these capabilities taken into consideration, the instant invention addresses many of the shortcomings of the prior art and offers significant benefits heretofore unavailable. Further, none of the above inventions and patents, taken either singly or in combination, is seen to describe the instant invention as claimed.

SUMMARY OF INVENTION

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations. An object of this invention is to provide an adjustable animal collar, which can include various designs of harness. Further objects of the invention are to provide a good looking, strong, and safe animal collar.

In its most general appearance the instant invention embodies an adjustable animal collar, comprising in part a strap with a housing connected at a first end and a second end. The housing receives the second end of the strap, completing the circumferential nature of the collar about an animal's neck. The collar provides means for positive closure with an engagement region formed with a plurality of teeth in the strap that are engaged by a pawl in the housing.

The pawl pivots within the housing about a first axis and has an engagement end and a disengagement end located on opposing sides of the first axis. The pawl is pivotably biased with a biasing means such that the engagement end is biased to rotate in an engagement direction about the first axis. This tends to keep the pawl engaged with at least one tooth of the engagement region and prevents the collar from releasing unless the pawl is actively disengaged. In one embodiment, the biasing device is at least one torsion spring.

Various arrangements of pins or bosses and recesses are used to rotatably retain the pawl in the housing and to allow the pawl to alternatively engage and disengage at least one of the plurality of teeth. In embodiments using a pin and recess combination, the pawl may rotate about a non-rotating pin, or the pin itself may rotate.

An important feature in some embodiments of the collar is at least one locking safety device. The safety device has at least two functions. It prevents the unintentional release of the pawl, and thereby, the unintentional release of the collar. Perhaps more importantly, it locks the collar at a predetermined tightness, so that the animal cannot endanger itself by tightening the collar. The safety device can act, among other methods, through releasable engagement with the pawl, by directly engaging the teeth, or through compression of at least one part of the strap; and can move in a linear, rotary, or other direction as will be appreciated by one skilled in the art.

An attachment device is movably secured to the strap, by which various accessories, such as tethers or leashes, can be attached to the collar. A cover plate may be releasably secured to the housing and formed to substantially cover the pawl, thereby protecting the pawl mechanism and enhancing the appearance of the collar.

The collar may be fabricated such that the housing further includes a rigidity insert, fabricated of a material with greater rigidity than the housing, increasing the overall rigidity and durability of the collar. The rigidity insert may display a safety indicia area when the safety device is in the unlocked position, potentially alerting the user as to the locked or unlocked status of the safety device.

The collar may incorporate various accessory capacities. These can include, by way of example and not limitation, such items as an insert region, wherein items like identification indicia such as name tags or licenses may be inserted into the collar. Additionally, the collar may provide for the attachment of additional items such as, by way of example and not limitation, electric fence sensors or electric training aids, through the provision of at least one accessory attachment engager.

The adjustable animal collar of the instant invention enables a significant advance in the state of the art. The instant invention is, in addition, widely applicable to a large number of applications. The various embodiments, as would be understood by one skilled in the art, would be suitable to any application requiring a potentially finely adjustable, positive closure that is lockable. Such applications could include, by way of example and not limitation, watch bands, arm or waist bands formed to hold accessory devices, or sports hats or caps. The preferred embodiments of the apparatus accomplish this by new and novel arrangements of elements that are configured in unique and novel ways and which demonstrate previously unavailable but preferred and desirable capabilities.

It is to be understood, however, that the same or equivalent functions and features may be accomplished by different embodiments that are also intended to be encompassed within the spirit and scope of the invention.

BRIEF DESCRIPTION OF THE DRAWINGS

Without limiting the scope of the present invention as claimed below and referring now to the drawings and figures:

Also, in the various figures and drawings, the following reference symbols and letters are used to identify the various elements and directions described herein below in connection with the several figures and illustrations: M, T.

DETAILED DESCRIPTION OF THE INVENTION

The adjustable collar of the instant invention enables a significant advance in the state of the art. The preferred embodiments of the apparatus accomplish this by new and novel arrangements of elements that are configured in unique and novel ways and which demonstrate previously unavailable but preferred and desirable capabilities.

Figure 1:
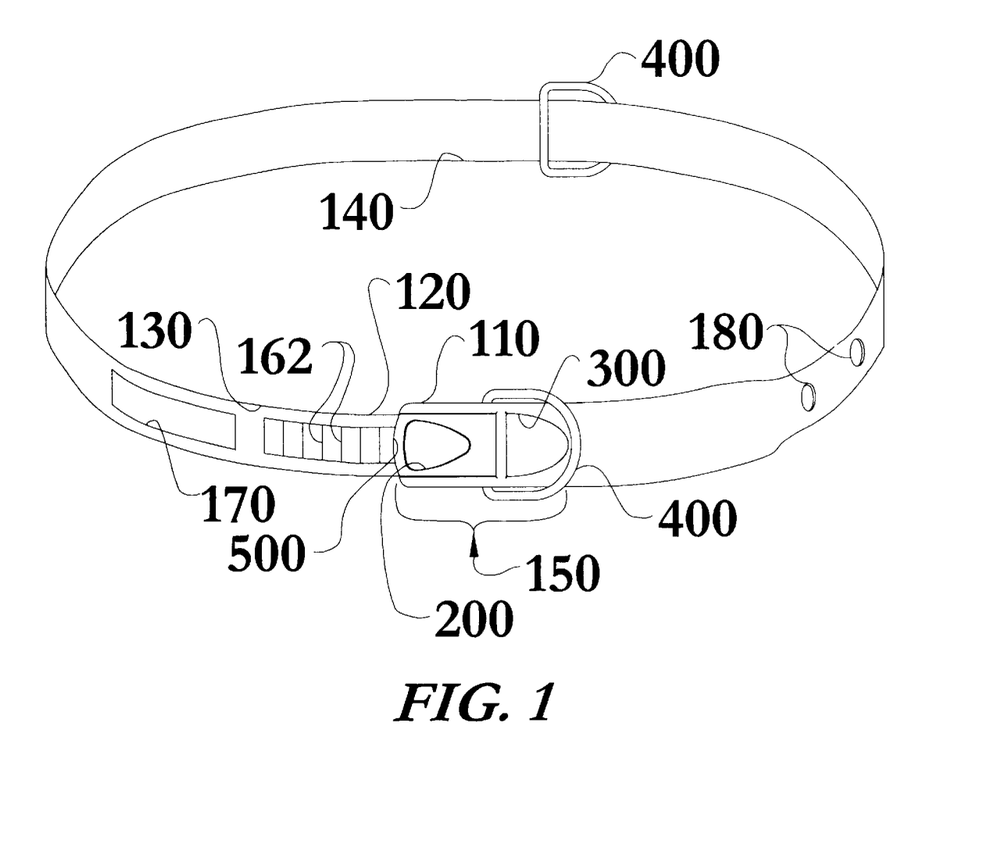
FIG. 1 shows the adjustable collar of the instant invention in elevated perspective view.

The detailed description of the collar set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention. These variations, modifications, alternatives, and alterations of the various preferred embodiments, arrangements, and configurations may be used alone or in combination with one another as will become more readily apparent to those with skill in the art with reference to the following detailed description of the preferred embodiments and the accompanying figures and drawings. In its most general appearance, referring now to FIGS. 1–12, the instant invention embodies an adjustable animal collar 50, comprising in part a strap 100 having a first end 110, a second end 120, and at least a top surface 130 and a bottom surface 140, as seen in FIG. 1. The collar 50 also features a housing 150, seen in FIGS. 1–11, connected to the strap 100, located substantially at the first end 110, and the housing 150 is adapted to slidably receive the second end 120, completing the circumferential nature of the collar 50 about an animal's neck. In a preferred embodiment, seen in FIGS. 2, 4, 5, 6, 7, 9, 10, and 11, the housing 150 is formed in the strap 100. The collar 50 provides for positive closure with an engagement region 160 attached to the strap 100 and located substantially at the second end 120, formed to include a plurality of teeth 162. In a preferred embodiment, the engagement region 160 is formed in the strap 100. The width of the teeth 162 may be varied according to the application intended; it is estimated that a 2 mm tooth provides excellent adjustability for a dog collar.

Figure 2:
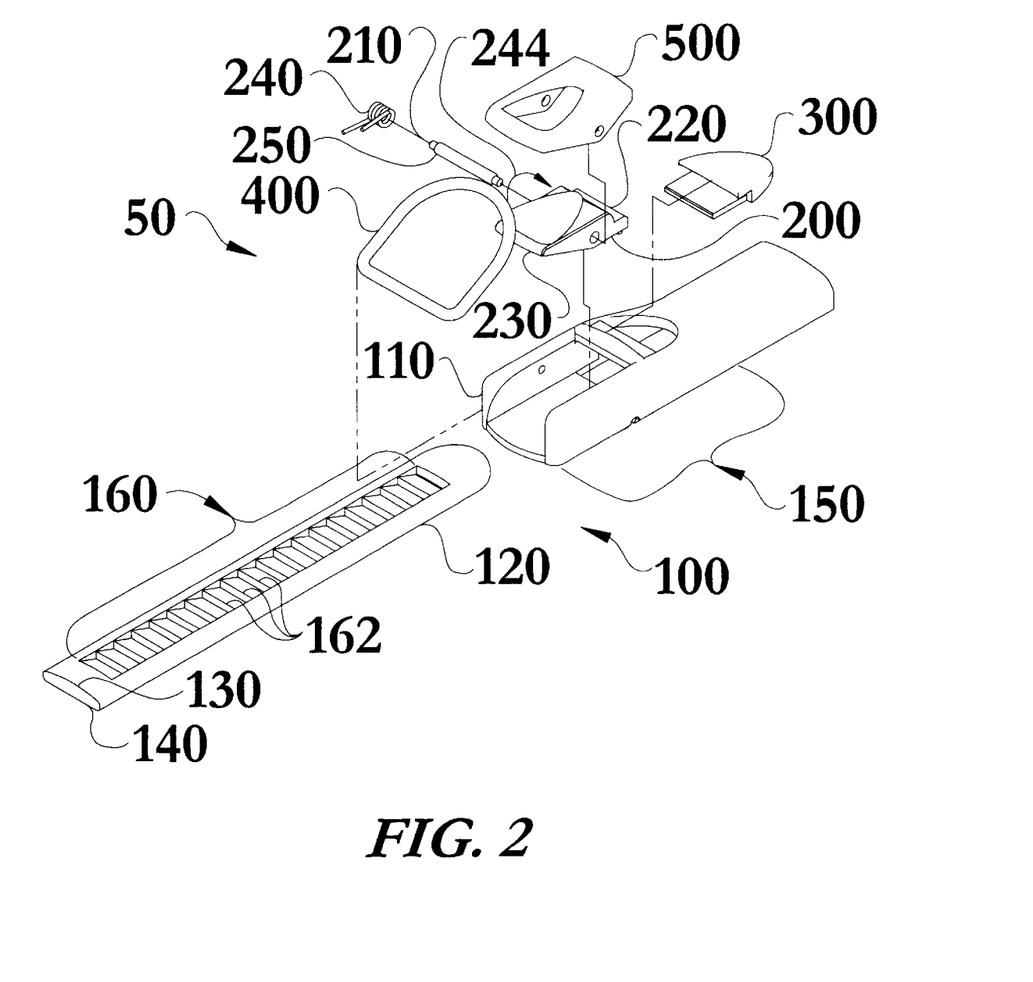
FIG. 2 shows a portion of the adjustable collar of FIG. 1 in elevated perspective assembly view.
Figure 3:
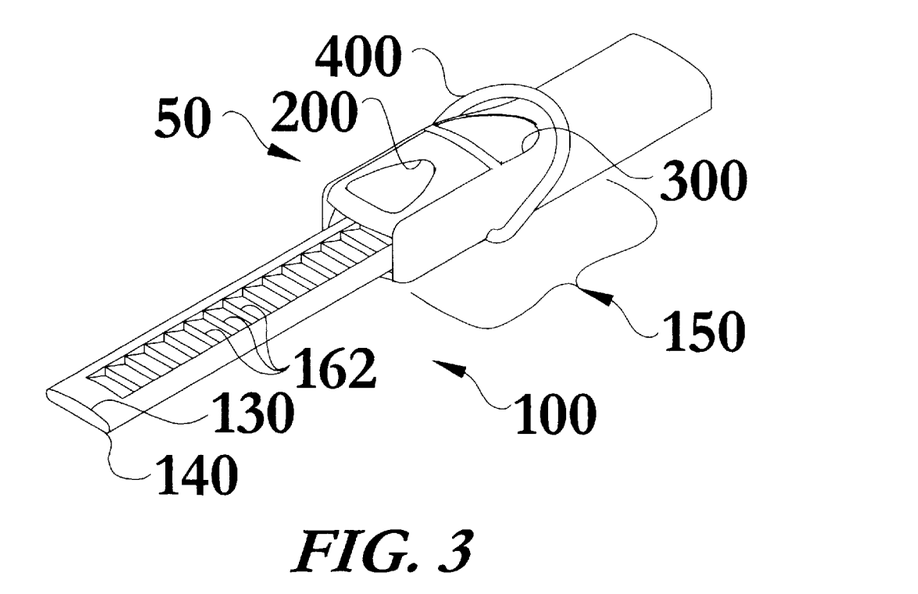
FIG. 3 shows a portion of the adjustable collar of FIG. 1 in elevated perspective view.

Referring now to FIG. 2, the engagement region 160 may be formed on various surfaces on the collar, although in the preferred embodiment, the engagement region 160 is formed on the top surface 130 of the strap 100. The collar 50 may be configured so that the second end 120, when the collar 50 is closed, passes through the housing 150 and lies either over or under the first end 110. In one embodiment, seen in FIGS. 9 and 10, the second end 120 passes through the housing 150 and lies under the first end 110, which confers the advantage of having the second end 120 relatively more protected and less likely to become loose or worn. As seen in FIGS. 1, 2, 8, and 9, the plurality of teeth 162 are engaged by a pawl 200, pivotably mounted to the housing 150 about a first axis 210 and having an engagement end 220 and a disengagement end 230 located on opposing sides of the first axis 210. The pawl 200 is pivotably biased with a biasing means 240 such that the engagement end 220 is biased to rotate in an engagement direction 244, shown in FIG. 2, about the first axis 210. This tends to keep the pawl 200 engaged in the engagement direction 244 with at least one tooth 162 of the engagement region 160 and prevents the collar 50 from releasing unless the pawl 200 is actively disengaged. In one embodiment, seen in FIG. 4, the biasing means 240 is at least one torsion spring 242. As would be understood by one skilled in the art, the collar 50 may be formed, in different embodiments, to have different sized teeth 162. This would give the collar 50 the capacity for relatively either large or small incremental adjustments as the teeth 162 pass the pawl 200. The pawl 200 is maintained within the housing 150 and rotates by means of a pawl retention means 250 formed to releasably retain the pawl 200 within the housing 150, seen in FIG. 2. Various means may be used to retain the pawl 200 within the housing 150, as seen in FIGS. 4, 5, 6, and 7. In one embodiment, seen in FIG. 4, the pawl retention means 250 further includes a pin 252 passing through a pin receiver 262 in the pawl 200 on the first axis 210 engaging at least one cooperating housing recess 256. Alternatively, the pawl retention means 250 can further include a plurality of pins 252 engaging a plurality of cooperating housing recesses 256 located on the first axis 210, as shown in FIG. 7. The at least one pin 252 may be fixed in a non-rotating manner within the housing 150, allowing the pawl 200 to rotate about a fixed pin 252, or the pin 252 may rotatably engage at least one cooperating housing recess 256.

Figure 4:
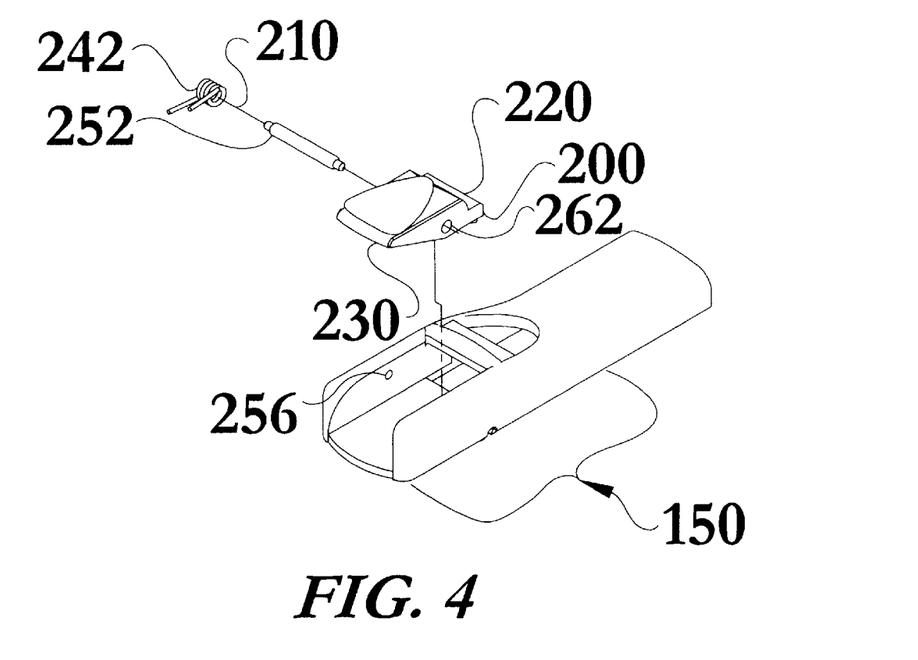
FIG. 4 shows a portion of the adjustable collar of FIG. 1 in elevated perspective assembly view.
Figure 5:
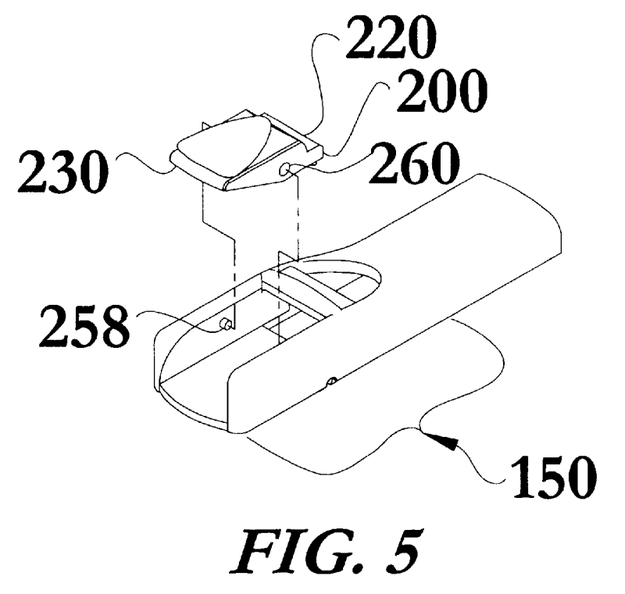
FIG. 5 shows a variation of a portion of the adjustable collar of FIG. 1 in elevated perspective assembly view.
Figure 6:
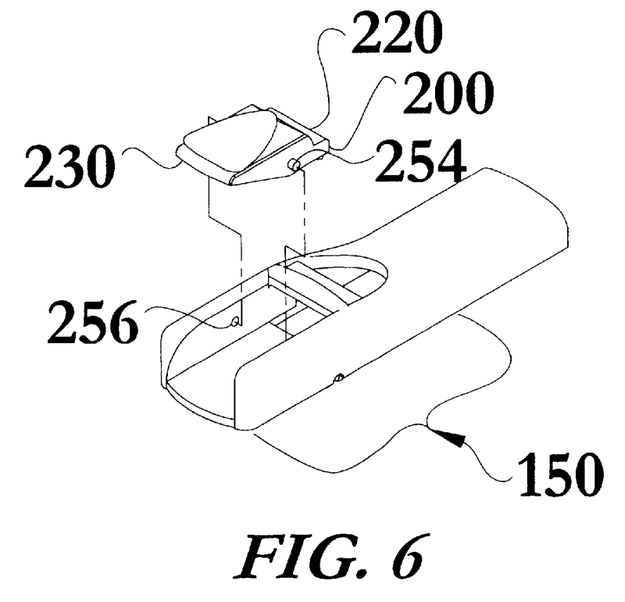
FIG. 6 shows a variation of a portion of the adjustable collar of FIG. 1 in elevated perspective assembly view.
Figure 7:
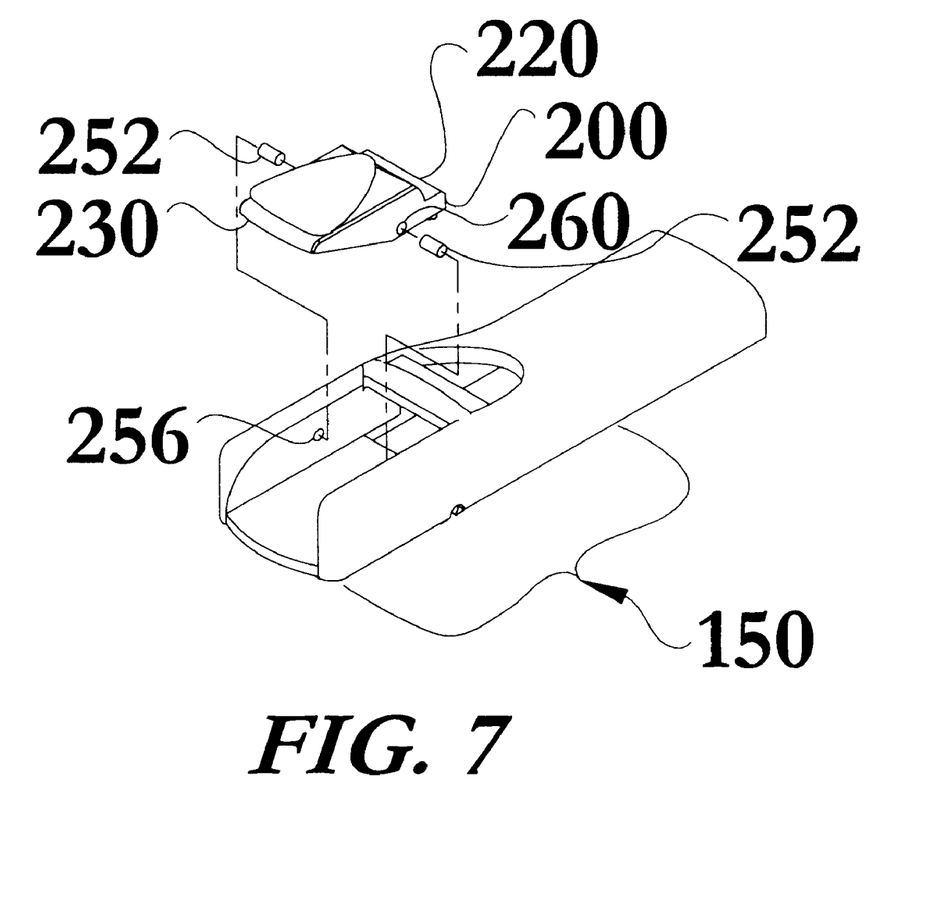
FIG. 7 shows a variation of a portion of the adjustable collar of FIG. 1 in elevated perspective assembly view.
Figure 8:
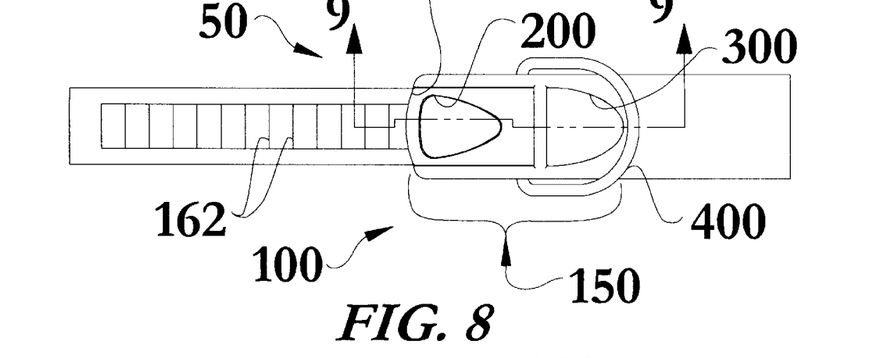
FIG. 8 shows a portion of the adjustable collar of FIG. 1 in top plan view.

Alternate means of retaining the pawl 200 within the housing 150, as seen in FIGS. 4, 5, and 6; include bosses 254, 258 which engage cooperating recesses 256, 260. In one such embodiment, shown in FIG. 6, there is at least one pawl boss 254 formed in the pawl 200 on the first axis 210 and formed to engage in at least one cooperating housing recess 256 formed in the housing 150. In an alternate embodiment, shown in FIG. 5, the pawl retention means 250 further includes at least one housing boss 258 formed in the housing 150 on the first axis 210 and formed to engage in at least one cooperating pawl recess 260 formed in the pawl 200.

Figure 9:
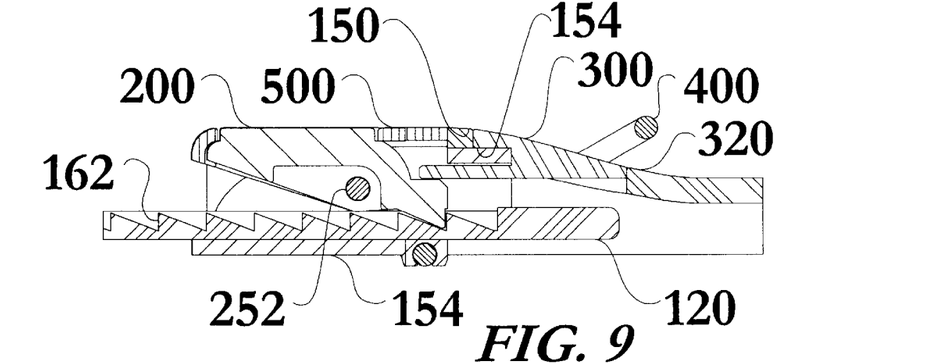
FIG. 9 shows a cross section view of the apparatus shown in FIG. 8 taken along section lines 9—9 of FIG. 8 showing the locked position.
Figure 10:
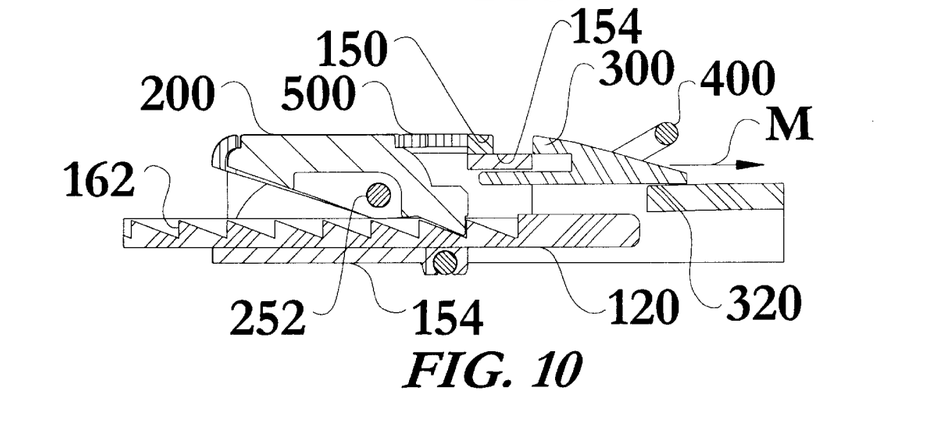
FIG. 10 shows a cross section view of the apparatus shown in FIG. 8 taken along section lines 9—9 of FIG. 8 showing the unlocked position.

An important feature in some embodiments of the collar 50 is at least one safety device 300, FIGS. 1, 7, 8, 9, and 10, having a locked position, seen in FIG. 9, and an unlocked position, seen in FIG. 10, adapted to secure the first end 110 to the second end 120. Such a safety device 300 prevents the unintentional release of the pawl 200, and thereby, the unintentional release of the collar 50, as well as to prevent inadvertent tightening of the collar 50. Depressing the safety device retainer 320 allows the safety device 300 to move in direction M. To unlock the collar 50, the safety device 300 must be in the unlocked position, that is, must be slid away from the housing 150 in direction M, so that the pawl 200 may be rotated against the resistance of the biasing means 240 to release the pawl 200 from the plurality of teeth 162. To lock the collar 50, the user slides the safety device 300 towards the housing 150 in direction M. Release of pressure against the safety device retainer 320 causes the elastic rebound of the safety device retainer 320 to secure the safety device 300 and prevents sliding of the safety device 300 in direction M.

Figure 11:
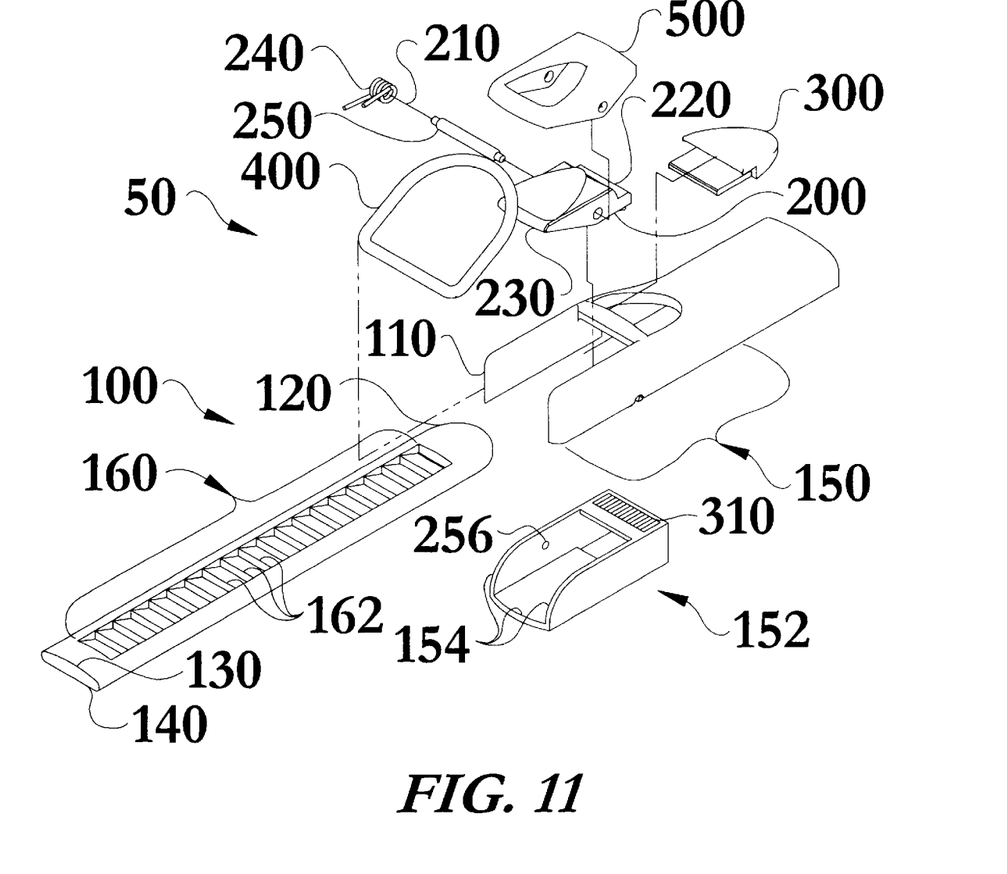
FIG. 11 shows a portion of the adjustable collar of FIG. 1 in elevated perspective assembly view.

At least one attachment device 400, seen in FIG. 11, is movably secured to the strap 100, by which various accessories, such as tethers or leashes, can be attached to the collar 50. As seen in FIG. 1, the at least one attachment device 400 can be attached at a plurality of locations on the collar 50, or may be movably attached to the collar 50. A cover plate 500 may be releasably secured to the housing 150 and formed to substantially cover the pawl 200, thereby protecting the pawl 200 and enhancing the appearance of the collar 50, while minimizing the potential for the animal's fur becoming entangled in the pawl 200. In additional embodiments, by way of example and not limitation, such as watch bands, arm or waist bands formed to hold accessory devices, or sports hats or caps, the housing 150, pawl 200, and cover plate 500 assemblies incorporate additional decorative and functional items, again by way of example and not limitation, a watch built into the cover plate 500.

In additional embodiments, the housing 150 may be formed to display a safety indicia area 310, shown in FIG. 11, when the safety device 300 is in the unlocked position. This alerts the user to the locked or unlocked status of the safety device 300. A means of operation for the safety device 300 can include a releasable engagement of the pawl 200, thereby preventing rotation of the pawl 200 and locking the engagement end 220 against at least one of the plurality of teeth 162. The safety device 300 may be formed, and function, in a number of other configurations. For instance, the safety device 300 may slide away from the housing 150 in a direction orthogonal to that of direction arrow M in FIG. 10. Additionally, the safety device 300 may directly engage the teeth 162 to lock the first end 110 and the second end 120. Further, the safety device 300 may achieve the locking function with motions other than the linear sliding motions previously described. For instance, the safety device 300 may lock and unlock via rotary, or twisting motion, as well as variations wherein compressive forces act to lock and unlock the safety device 300.

Referring now to FIG. 11, the collar may be fabricated such that the housing 150 further includes a rigidity insert 152, fabricated of a material with greater rigidity than the housing 150, having a plurality of sidewalls 154 formed to increase the rigidity of the housing 150. This tends to increase the overall rigidity of the housing 150 and enhance the durability and reliability of the collar 50. The plurality of sidewalls 154 may be formed to enclose at least a portion of the second end 120 when the second end 120 is slidably received by the housing 150. In embodiments utilizing the rigidity insert 152, the rigidity insert 152 may be formed to display a safety indicia area 310, seen in FIG. 11, when the safety device 300 is in the unlocked position. Similarly to those embodiments where the safety indicia 310 is formed as part of the housing 150, a safety indicia area 310 on the rigidity insert 152 potentially alerts the user to the locked or unlocked status or the safety device 300.

Figure 12:
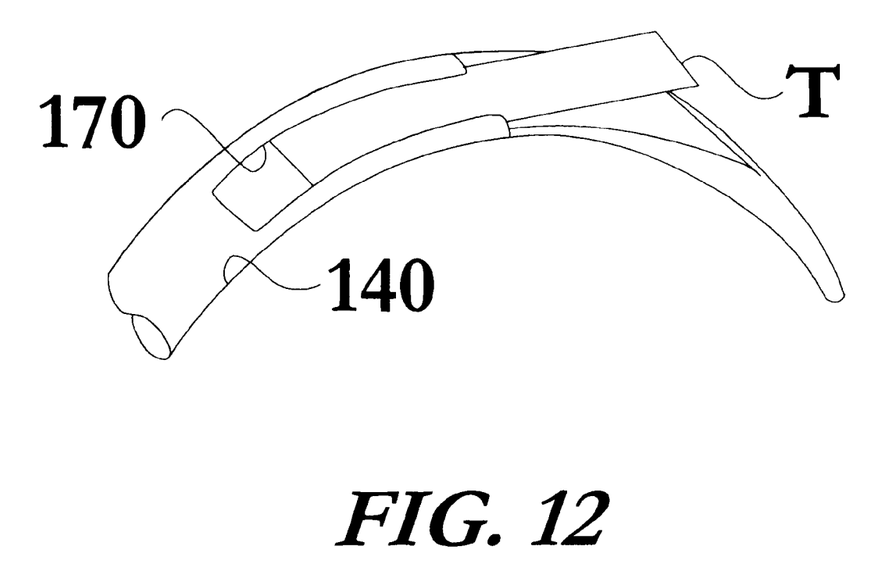
FIG. 12 shows a portion of the adjustable collar of FIG. 1 in elevated perspective view.

The collar 50 may incorporate various accessory capacities. The can include, referring now to FIGS. 1 and 12, by way of example and not limitation, such items as an insert region 170, wherein such items as name tags or licenses T may be inserted into the collar 50. The insert region 170 may be configured with a wide array of channels, ridges, tabs, and flaps, as would be apparent to one skilled in the art, to retain various types of paper, plastic, and metal, indicia. Bending of the collar 50, as shown in FIG. 12, is just one of many ways in which the insert region 170 may be opened to accept identification tags T. Additionally, the collar 50 may provide for the attachment of additional items, by way of example and not limitation, electric fence sensors or electric training aids, with the provision of at least one accessory attachment engager 180.

Any number of materials may be utilized in the construction of the collar 50 including virtually any material such as elastomers, plastics, and composites. In the preferred embodiments, various elements are composed of thermal plastic elastomers, ABS, vacuum metalized plastics, and various metals. Similarly, numerous joining methods may be utilized to assemble the various components of the collar 50. For example, the rigidity insert 152 may be overmolded to the housing 150 in those embodiments wherein the housing 150 is formed in the strap 100, as seen in FIGS. 2, 4, 6, 7, 9, and 10, thereby eliminating the need for traditional mechanical fasteners.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims.

I claim:

1. An adjustable collar, comprising:
    a strap having a first end, a second end, and at least a top surface and a bottom surface;
    a housing connected to the strap, located substantially at the first end, and adapted to slidably receive the second end, wherein the housing further includes a rigidity insert having a plurality of sidewalls formed to increase the rigidity of the housing;
    an engagement region connected to the strap and located substantially at the second end, the engagement region formed to include a plurality of teeth;
    a pawl pivotably mounted to the housing about a first axis, having an engagement end and a disengagement end, each end located on opposing sides of the first axis, wherein the pawl is pivotably biased with a biasing means such that the engagement end is biased to rotate in an engagement direction about the first axis;

a pawl retention means formed to releasably retain the pawl within the housing; and an attachment device movably secured to the strap.

2. The collar according to claim 1, wherein the engagement region is formed in the strap.

3. The collar according to claim 1, wherein the housing is formed in the strap.

4. The collar according to claim 1, wherein the collar is formed with a safety device, having a locked position and an unlocked position, adapted to secure the first end to the second end.

5. The collar according to claim 4, wherein the safety device is adapted to releasably engage the pawl thereby locking the engagement end against at least one of the plurality of teeth.

6. The collar according to claim 4, wherein the housing further includes at least one safety device retainer.

7. The collar according to claim 1, wherein the collar is formed with a cover plate releasably secured to the housing and formed to substantially cover the pawl.

8. The collar according to claim 1, wherein the housing is formed to display at least one safety indicia area when the safety device is in the unlocked position.

9. The collar according to claim 1, wherein the plurality of sidewalls are formed to enclose at least a portion of the second end when the second end is slidably received by the housing.

10. The collar according to claim 1, wherein the rigidity insert is formed to display at least one safety indicia area when the safety device is in the unlocked position.

11. An adjustable collar, comprising:

a strap having a first end, a second end, and at least a top surface and a bottom surface;

an engagement region connected to the strap and located substantially at the second end, the engagement region formed to include a plurality of teeth;

a pawl pivotably mounted to the housing about a first axis, having an engagement end and a disengagement end, each end located at opposing sides of the first axis, wherein the pawl is pivotably biased with a torsion spring such that the engagement end is biased to rotate in an engagement direction about the first axis;

a pawl retention means formed to releasably retain the pawl within the housing;

a housing connected to the strap, including a rigidity insert having a plurality of sidewalls, located substantially at the first end, and adapted to slidably receive the second end and formed to display at least one safety indicia area when the at least one safety device is in the unlocked position;

an attachment device movably secured to the strap;

an insert region formed in the strap; and an accessory attachment engager.

12. The collar according to claim 11, wherein the engagement region is formed in the strap.

13. The collar according to claim 11, wherein the collar is formed with a safety device, having a locked position and an unlocked position, adapted to secure the first end to the second end.

14. The collar according to claim 13, wherein the at least one safety device is adapted to releasably engage the pawl thereby locking the engagement end against at least one of the plurality of teeth.

15. The collar according to claim 11, wherein the collar is formed with a cover plate releasably secured to the housing and formed to substantially cover the pawl.

16. The collar according to claim 11, wherein the housing is formed in the strap.

17. The collar according to claim 11, wherein the pawl retention means further includes a plurality of pins engaging a plurality of cooperating housing recesses located on the first axis.

18. The collar according to claim 11, wherein the pawl retention means further includes at least one pawl boss formed in the pawl on the first axis and formed to engage at least one cooperating housing recess formed in the housing.

19. The collar according to claim 11, wherein the pawl retention means further includes at least one housing boss formed in the housing on the first axis and formed to engage at least one cooperating pawl recess formed in the pawl.

20. The collar according to claim 11, wherein the engagement region is formed on the top surface of the strap.

21. An adjustable collar, comprising:

a strap having a first end, a second end, and at least a top surface and a bottom surface;

an engagement region formed in the top surface of the strap and located substantially at the second end, the engagement region formed to include a plurality of teeth;

a pawl pivotably mounted to the housing about a first axis, having an engagement end and a disengagement end, each end located on opposing sides of the first axis, wherein the pawl is pivotably biased with a torsion spring such that the engagement end is biased to rotate in an engagement direction about the first axis;

a pawl retention means formed to releasably retain the pawl within the housing formed to further include a pin passing through a pin receiver formed in the pawl on the first axis thereby engaging at least one cooperating housing recess;

at least one safety device, having a locked position and an unlocked position, secured by at least one safety device retainer, the at least one safety device adapted to secure the first end to the second end, and adapted to releasably engage the pawl thereby locking the engagement end against at least one of the plurality of teeth;

a housing formed in the strap, including a rigidity insert having a plurality of sidewalls, formed to enclose at least a portion of the second end when the second end is slidably received by the housing, located substantially at the first end, and formed to display at least one safety indicia area when the at least one safety device is in the unlocked position;

an attachment device movably secured to the strap;

an insert region formed in the strap;

an accessory attachment engager; and a cover plate releasably secured to the housing and formed to substantially cover the pawl.

* * * * *